(12) United States Patent
Nicholson et al.

(10) Patent No.: US 9,024,958 B2
(45) Date of Patent: May 5, 2015

(54) BUFFERING MECHANISM FOR CAMERA-BASED GESTURING

(75) Inventors: John Weldon Nicholson, Holly Springs, NC (US); Jennifer Greenwood Zawacki, Hillsborough, NC (US); Howard J. Locker, Cary, NC (US); Daryl C. Cromer, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 117 days.

(21) Appl. No.: 13/361,147

(22) Filed: Jan. 30, 2012

(65) Prior Publication Data
US 2013/0194287 A1     Aug. 1, 2013

(51) Int. Cl.
*G09G 5/36*     (2006.01)

(52) U.S. Cl.
CPC ......................................... *G09G 5/36* (2013.01)

(58) Field of Classification Search
CPC .......... G09G 5/393; G09G 5/39; G09G 5/234
USPC ......................................................... 345/547
See application file for complete search history.

(56) References Cited

U.S. PATENT DOCUMENTS

| | | | | |
|---|---|---|---|---|
| 5,450,544 | A * | 9/1995 | Dixon et al. ................... | 345/555 |
| 5,956,153 | A * | 9/1999 | Hirabayashi .................. | 382/239 |
| 5,982,418 | A * | 11/1999 | Ely .............................. | 348/153 |
| 7,643,422 | B1 * | 1/2010 | Covell et al. .................. | 370/235 |
| 2005/0212756 | A1 * | 9/2005 | Marvit et al. ................. | 345/156 |
| 2008/0094427 | A1 * | 4/2008 | Debonnet ...................... | 345/698 |
| 2010/0150241 | A1 * | 6/2010 | Nilsson et al. ............ | 375/240.16 |
| 2011/0221974 | A1 * | 9/2011 | Stern et al. .................... | 348/734 |

* cited by examiner

*Primary Examiner* — James A Thompson
*Assistant Examiner* — Tapas Mazumder
(74) *Attorney, Agent, or Firm* — Brian J. Pangrle (57) ABSTRACT

A method can include buffering video data to a buffer that includes a buffer capacity that corresponds to a video time interval; sampling video data at a sampling rate of at least once per video time interval; processing the sampled video data for gesture evidence; and, responsive to gesture evidence in the sampled video data, processing the buffered video data for additional gesture evidence. Various other apparatuses, systems, methods, etc., are also disclosed.

15 Claims, 10 Drawing Sheets

BUFFERING MECHANISM FOR CAMERA-BASED GESTURING

TECHNICAL FIELD

Subject matter disclosed herein generally relates to techniques for gesturing.

BACKGROUND

Gestures are used in many fields, from bartering to transportation to music to computing. In bartering, transportation and music, gestures usually convey information directly from one human to another. In the field of computing, a gesture may be part of a human-machine command interface, protocol, etc. While gestures are often associated with bodily signs or movements, regardless of the field, a person may possibly make a gesture using a tool, an instrument, etc. As examples, consider a conductor with a baton, an air marshaller with lighted wands, or a stock trader with a colored card.

In the field of computing, gestures have also become associated with so-called touch or multi-touch sensors that require physical contact or close-contact (e.g., close EM field sensors) with a generally flat sensing surface. As to non-touch or non-contact gestures, a camera may be implemented along with associated circuitry to acquire, stream and analyze video data for purposes of gesture detection. When compared to contact-based systems, non-contact systems can provide some additional freedom, for example, by allowing a person to be some distance from a camera, a computing system, etc.

Where video data are relied upon for gesture detection, such data may be streamed according to a particular format, such as the Common Intermediate Format (CIF, H.261 standard), which specifies a video resolution of 352×240 pixels (width×height) with a frame rate of 30000/1001 (about 30 fps) and color encoding as YCbCr 4:2:0; a Video Graphics Array (VGA) "format", which specifies a resolution of 640× 480 pixels (width×height) and a frame rate of about 15 fps; or other format. Whether video is streamed according to CIF, VGA or other format, such streaming and analysis of video data can place substantial demands on a computing system. Where such a computing system has only on/off control for non-contact gesturing, performance may differ substantially between on and off states. Further, in an off state, it is not possible to turn the gesturing feature on by using a non-contact gesture. Given such constraints, a user may simply leave the gesturing feature in an on state and accept degraded performance or simply leave the gesturing feature in an off state and not use it.

As described herein, various technologies, techniques, etc., can optionally provide for gesture detection with reduced resource demands, which, in turn, may, for example, improve computing performance, user experience, etc.

SUMMARY

A method can include buffering video data to a buffer that includes a buffer capacity that corresponds to a video time interval; sampling video data at a sampling rate of at least once per video time interval; processing the sampled video data for gesture evidence; and, responsive to gesture evidence in the sampled video data, processing the buffered video data for additional gesture evidence. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

A buffering mechanism for camera-based gesturing can include intermittent analysis of video data (e.g., intermittent processing of video data). For example, given a camera that can stream video data, some amount of the video data may be buffered while also sampling and analyzing the video data one frame, or a few frames, at a time to determine if a user is performing a gesture. Based on the sampling and analyzing, if it is determined that the user is performing a gesture, then the buffered video data is analyzed (e.g., processed using one or more processors). In such an example, a video stream may be buffered in dedicated hardware at the camera or in main memory at the operating system level. As to an analysis of one or more intermittent frames (e.g., at a rate of once per second or other suitable rate), if such an analysis shows that the user is moving (e.g., evidence of a gesture), a trigger may be issued that calls for an analysis of the buffered video data for purposes of recognizing a gesture (e.g., the gesture "seen" in the one or more intermittent frames). To implement such an approach, a buffer size (e.g., buffer capacity) may be set to be long enough to hold all of possible gestures of a set of gestures and the intermittent sampling period should be short enough that the shortest allowable gesture will cause issuance of a trigger that calls for looking at the video data in the buffer. As described in various examples, a buffer capacity may be determined based at least in part on a maximum gesture time or duration for a user, which may be preset, adjustable or learned by a user performing the gesture. As a user becomes more accustomed to gesturing, gesture times may become shorter and, for example, approach a limit. A mechanism may be provided that allows for tracking gesture times of a user and optionally adjusting buffer capacity or one or more other parameters for gesture detection.

As to analysis of buffered video data, as described herein, the buffer may optionally be processed backwards from newest in time to oldest in time (e.g., according to one or more setting options). In such an example, processing circuitry may be provided that can recognize events performed "in reverse". Reverse analysis can allow for shorter gestures to be recognized more quickly, without having to play-through an entire buffer, which, as mentioned, may be set as being long enough to capture the longest gesture (e.g., of a set of gestures). As to sampling, a sampling mechanism may be configured to initiate, mid-gesture, an increased frame rate (e.g., full frame-rate) recognition engine. Such a sampling mechanism and recognition engine may be features of processing circuitry configured to receive video data via one or more interfaces. Where mid-gesture triggering occurs (e.g., at some time during a gesture), such processing circuitry may be provided with one or more features to look back in time through the gesture (e.g., as evidenced by buffered video data), as well as staying current with new frames as they are provided by the camera (e.g., "real-time" video data).

Depending on video data format, transfer technology, processing technology, etc., a system with a buffer and a sampling mechanism may be sufficient to detect all gestures in a set of gestures. For example, where buffer data transfer and processing of transferred data are on the order of several hundred milliseconds or less, given a sufficient sampling rate, the buffered data may, by itself, be sufficient to keep pace with a person gesturing. A buffer data transfer time and a processing time for transferred data may be considered, depending on device configuration, blanking times or blackout times for processing (e.g., where sampling does not occur); noting that buffering may continue during such blanking times. For some perspective as to timings, an input device such as mouse may have a double click time window of about 300 milliseconds, which can be achieved by most people upon moving a finger a millimeter or so on a mouse button. As to hand gestures, time windows for single hand or double hand gestures may be on the order of 500 milliseconds to a second or longer. Thus, a blanking period of several hundred milliseconds as to sampling may have little impact on user experience.

As described herein, a method can include buffering video data to a buffer that includes a buffer capacity that corresponds to a video time interval (e.g., based at least in part on a number of video frames); sampling video data at a sampling rate of at least once per video time interval; processing the sampled video data for gesture evidence; and, responsive to gesture evidence in the sampled video data, processing the buffered video data for additional gesture evidence. As mentioned, such processing may occur directionally from newest video data to oldest video data.

As described herein, a buffer may be a data structure configured as a circular buffer (e.g., cyclic buffer, ring buffer, etc.) defined at least in part by a parameter to provide a fixed-size buffer, as if it were connected end-to-end. In such an example, the fixed-size may be set or adjusted based on, for example, one or more factors such as a camera setting, available memory, gesture type, gesture distance, data transfer technique (e.g., wired or wireless) etc. A circular buffer may operate as a FIFO buffer; noting that reading of data in the buffer may occur based on one or more pointers, each of which may be incremented according to a forward, reverse, or other algorithm. As an example, a circular buffer may operate according to three pointers: one to the actual buffer in memory, one to point to the start of valid data, and one to point to the end of valid data. As an alternative example, a circular buffer may be a fixed-length buffer that includes two parameters (e.g., integers) to track indices (e.g., for use with programming languages that do not include pointers).

A circular buffer may be implemented using a scheme that includes mapping the underlying buffer to two contiguous regions of virtual memory. In such a scheme, reading from and writing to the circular buffer may then be carried out with greater efficiency by means of direct memory access (e.g., those accesses which fall beyond the end of the first virtual-memory region may automatically wrap around to the beginning of the underlying buffer). For example, given such an implementation, when the read offset is advanced into the second virtual-memory region, both offsets—read and write—are decremented by the length of the underlying buffer.

As described herein, a system can include circuitry to buffer video data; circuitry to sample video data; circuitry to process sampled video data for gesture evidence; circuitry to process buffered video data for gesture evidence; and circuitry to assign gesture evidence in sampled video data and gesture evidence in buffered video data to a single gesture. Such a system may include a circular buffer that receives video data from the circuitry to buffer video data. A system may include a video camera or one or more interfaces (e.g., wired, wireless or wired and wireless) for receipt of video data. As described herein, circuitry to process buffered video data for gesture evidence can include circuitry that acts in response to gesture evidence in sampled video data. As described herein, circuitry to sample video data can include a sampling resolution and circuitry to buffer video data can include a buffering resolution where, for example, the buffering resolution exceeds the sampling resolution. As described herein, circuitry to sample video data can include a frame sampling rate and circuitry to buffer video data can include a frame buffering rate where, for example, the frame buffering rate exceeds the frame sampling rate.

As described herein, one or more computer-readable media (e.g., non-transitory media) can include processor-executable instructions to instruct a processor to: buffer video data to a circular buffer; sample video data at a sampling rate; process sampled video data for evidence of a gesture; process buffered video data for additional evidence of a gesture responsive to evidence of a gesture in the sampled video data; and issue a command based at least in part on evidence of a gesture in the sampled video data and additional evidence of a gesture in the buffered video data. Such instructions may include instructions to instruct a processor to define a circular buffer based at least in part on a maximum gesture time, instructions to instruct a processor to define a sampling rate based at least in part on a minimum gesture time, instructions to instruct a processor to process buffered video data directionally toward older buffered video data, etc.

Figure 1:
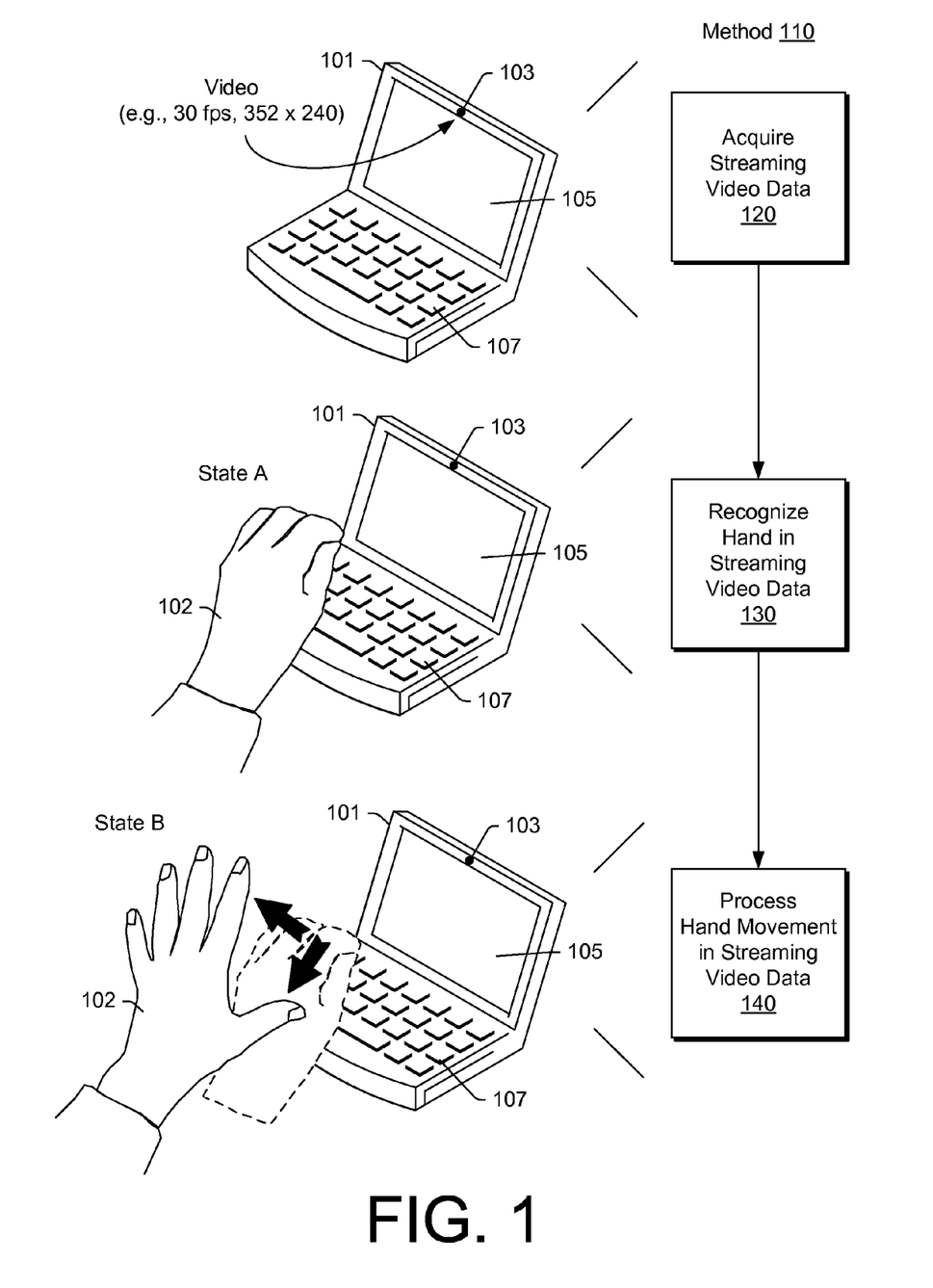
FIG. 1 is a diagram of an example of a method along with a scenario illustrating gesturing.

FIG. 1 shows a computing device 101 configured with a camera 103, a display 105 and a touch-based user interface 107 (e.g., a keyboard). A user's hand 102 may be positioned in a field-of-view (FOV) of the camera 103, at some distance from the camera 103, such that the camera 103 can acquire video data for processing by the device 101. As indicated, where the user's hand 102 moves from a first state (State A) to a second state (State B), given a sufficient video streaming rate (e.g., and resolution), the device 101 may detect the movement (e.g., a change in state) as a gesture. For example, a method 110 can include an acquisition block 120 to acquire streaming video data, a recognition block 130 to recognize a user's hand in the acquired streaming video data and a process block 140 to process movement or change in state of the user's hand in the streaming video data. The method 110 involves continuous streaming of the video data such that a user's hand can be recognized in the FOV of the camera 103 to thereby allow for gesturing. As mentioned, continuous streaming and associated processes can place demands on resources of a computing device. Accordingly, for the example of FIG. 1, the device 101 may perform other tasks more slowly due to memory and processing resources being dedicated to operation of full-time gesturing features.

Figure 2:
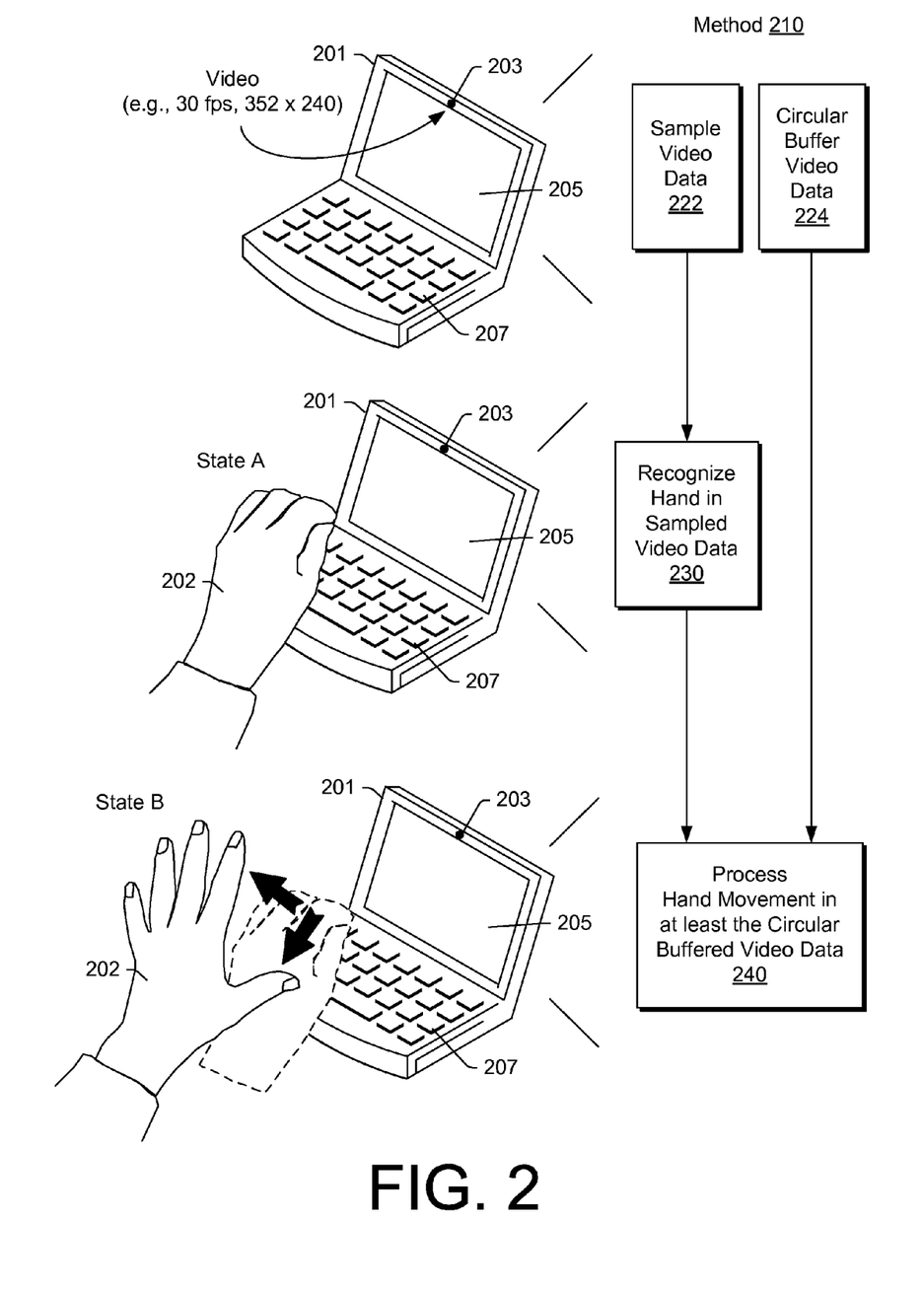
FIG. 2 is a diagram of an example of a method that includes sampling and buffering along with a scenario illustrating gesturing.

FIG. 2 shows a computing device 201 configured with a camera 203, a display 205 and a touch-based user interface 207 (e.g., a keyboard). A user's hand 202 may be positioned in a field-of-view (FOV) of the camera 203, at some distance from the camera 203, such that the camera 203 can acquire video data for processing by the device 201. In the example of FIG. 2, the device 201 provides for sampling acquired video data as well as buffering acquired video data, for example, in a circular buffer. As indicated, where the user's hand 202 moves from a first state (State A) to a second state (State B), given a sufficient sampling rate (e.g., and resolution), the device 201 may detect the movement (e.g., a change in state) as a gesture or as being associated with a gesture. Responsive to such detection, the device 201 can commence processing of video data in the buffer, for example, to detect further evidence of a gesture or gestures.

FIG. 2 also shows a method 210 that can include a sample block 222 for sampling acquired video data and a buffer block 224 for buffering acquired video data, a recognition block 230 for recognizing a user's hand in the sampled video data and a process block 140 for processing movement or change in state of the user's hand in at least the buffered video data. The method 210, through sampling and buffering, can avoid a need for continuous streaming of the video data, for example, at a high frame rate (e.g., such as 15 fps, 30 fps, etc.). For example, in the method 210, sampling can occur at a sampling rate that is less than an acquisition frame rate of the camera 203. Such an approach can reduce data transfer, memory and processing demands for the device 201. As to buffering, the device 201 may perform buffering at an acquisition frame rate of the camera 203 where a buffer is set to hold, for example, a few seconds to about 10 seconds of video data (e.g., based on a maximum gesture duration). Accordingly, the method 210 may allow gesture detection to be enabled without placing any significant demands on the device 201. Where gesture detection is enabled, a user may, at any time, make a gesture or gestures to instruct or command the device 201. Such instruction may be akin to instructing the device 201 via a mouse, touchpad, etc. (i.e., mechanisms that are usually continuously available for receipt of user input). Making gesture detection available without any significant detriment to computing performance can enhance user experience as well as overall acceptability of gesturing, improve a user's gesturing technique, improve gesture learning (e.g., training), etc.

Figure 3:
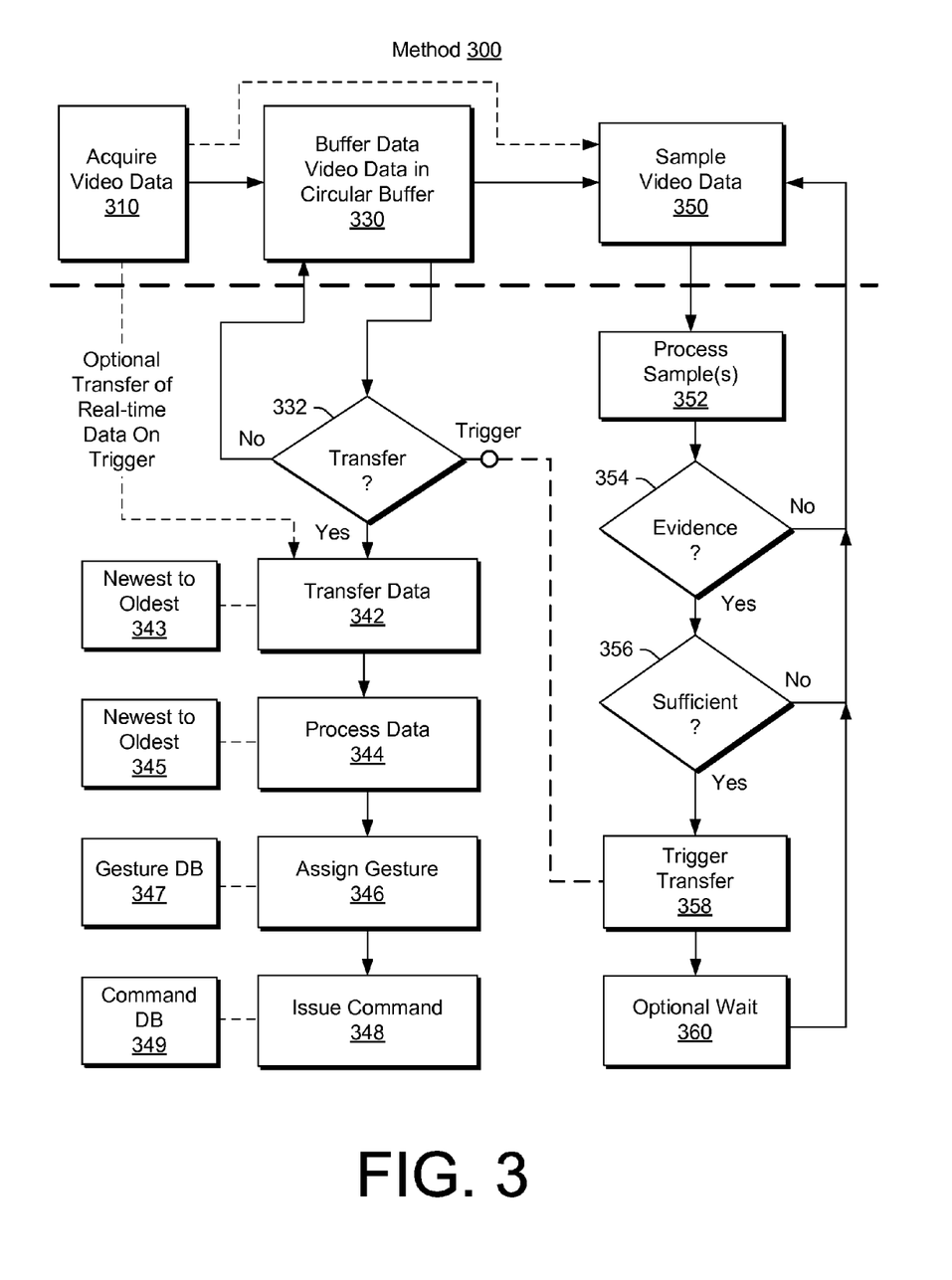
FIG. 3 is a diagram of an example of a method for camera-based gesturing.

FIG. 3 shows an example of a method 300 for camera-based gesturing. The method 300 includes an acquisition block 310, a buffer block 330 and a sample block 350. As indicated, the sample block 350 may sample video data from the acquisition block 310 or from the buffer block 330. For example, the acquisition block 310 may be associated with a camera while the buffer block 330 may be associated with buffer circuitry. In such an example, sampling circuitry may be configured to access or cause transmission of video data from the camera or from the buffer circuitry.

The example of FIG. 3 shows various processes that occur with respect to the blocks 310, 330 and 350. As the sample block 350 can trigger the buffer block 330, processes associated with the sample block 350 are discussed prior to processes associated with the buffer block 330.

As indicated, a process block 352 processes one or more samples of the sample block 350. A decision block 354 operates to decide if evidence of a gesture is present in one or more samples of video data. If the decision block 354 decides that evidence is not present, another sample may be taken upon return to the sample block 350. However, if the decision block 354 decides that evidence is present, another decision block 356 acts to decide if the evidence is sufficient as to warrant transferring of at least buffered video data (e.g., which may act to help eliminate noise, false positives, etc.). If the decision block 356 decides that the evidence is insufficient, another sample may be taken upon return to the sample block 350. However, if the decision block 356 decides that the evidence is sufficient (e.g., from one or more samples), then a trigger block 358 acts to trigger transfer of at least buffered video data. As actions stemming from such a trigger may increase demand on resources, an optional blanking, blackout or wait may be instituted per the wait block 360. For example, a wait of several hundred milliseconds may be instituted during which sampling is halted, processing of samples is halted, etc. Such an approach may act to expedite processes such as triggering, transferring and processing of buffered data, which, in turn, can increase responsiveness to gesturing.

Referring to the buffer block 330, a loop or interrupt may be provided in the form of a decision block 332 that acts in response to a trigger signal per the trigger block 358. If no trigger signal is present or received, the decision block 332 continues with buffering per the buffer block 330. However, if the decision block 332 decides that transfer should occur per presence or receipt of a trigger signal, then a transfer block 342 follows that acts to transfer buffered video data for processing. The transfer block 342 may operate according to one or more settings that provide for transferring the buffered video data, for example, in an order from newest in time to oldest in time (see, e.g., block 343). Upon transfer, a process block 344 processes the transferred buffered video data, optionally in an order from newest in time to oldest in time (see, e.g., block 353). Order of processing may be determined by the transfer block 342, the process block 344 or a combination of both the transfer block 342 and the process block 344 (e.g., transfer logic, process logic, or combined logic).

In the example of FIG. 3, the process block 344 may extract "hand" data using one or more video algorithms such as masking, sharpening, edge detection, etc. For example, a combination of algorithms may provide for extracting hand data from background data and tracking, from frame to frame, one or more edges or boundaries of the hand (e.g., optionally using control points, vectors, etc.). Given such processing, an assignment block 346 may assign a gesture or gestures, for example, using information in a gesture database 347. In turn, an issuance block 348 may issue a command, for example, using a command database 349 that relates gestures and commands.

In the example of FIG. 3, the gesture database 347 and the command database 349 may be associated with a user, an application, a distance from a camera, etc. For example, consider a user using a slide presentation application where the gesture database 347 provides long distance gestures and where the command database 349 relates long distance gestures to appropriate commands to command the slide presentation application. As another example, consider a user using a drawing application while seated before a camera. In such an example, the gesture database 347 provides short distance gestures and the command database 349 relates short distance gestures to appropriate commands to command the drawing application. A method may provide for automatic switching between gesture sets and related commands (e.g., based on user, application, distance, etc.). For example, where a user brings an application to the fore on a display, projection screen, etc., or otherwise activates an application, an operating system signal may instruct gesturing circuitry to be configured for that application (e.g., dynamic switching based on OS or other information).

The example of FIG. 3 also shows an optional transfer of real-time data on trigger from the acquisition block 310 to the transfer block 342. Depending on various parameters, resources, timings, etc., the method 310 may benefit from transfer of real-time data (e.g., acquired camera data with delay less than about 100 ms). In such a scheme, processing per the process block 344 may occur for both buffered video data and real-time video data. Further, buffered video data may be processed in a backward in time direction while real-time video data are processed in a forward in time direction. As to backward in time processing, the process block 344 can identify and chain evidence according to a reverse gesture. For example, given the closed to open hand example in FIG. 1 and FIG. 2, reverse processing may identify an open hand and look backward in time through the buffered video data for a closed hand. In contrast, forward processing may identify a closed hand and expect or look forward in time for an open hand (e.g., in the transferred "real-time" data). A method may include processing that appends or concatenate information (e.g., gesture evidence) from a reverse analysis of buffered video data and a forward analysis of real-time video data to construct a gesture or string of gestures.

Figure 4:
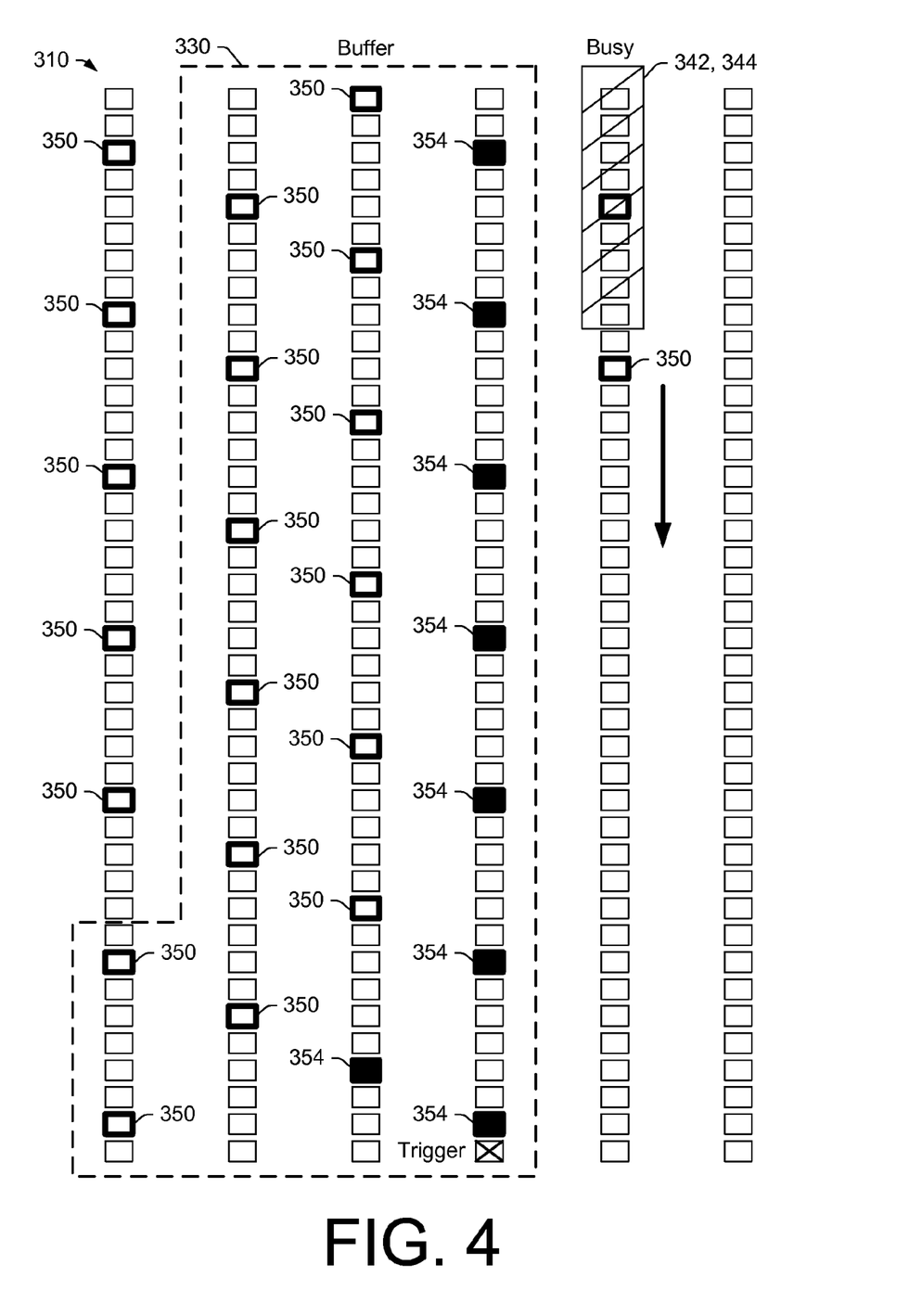
FIG. 4 is a diagram of an example of video data frames including sampled frames and buffered frames.

FIG. 4 shows an example of acquired data associated with the acquisition block 310 of FIG. 3, as well as buffered data associated with the buffer block 330 of FIG. 3 and sampled data associated with the sample block 350 of FIG. 3. In the example of FIG. 4, acquisition may occur at a frame rate of about 30 fps and sampling may occur at a sampling rate of about 5 fps. For example, the sampling rate may be set to a rate sufficient to acquire multiple samples for even a short gesture (e.g., a gesture having a duration of less than about one second), which may represent a minimum duration for a gesture in a set of gestures. In such an example, given a desired Minimum Number of Samples per shortest gesture (e.g., MNS=2) and a Shortest Gesture Time (e.g., SGT=0.8 s), a Sampling Rate may be determined, optionally with a Safety Factor to enhance detection (e.g., SR=SF*(MNS/SGT)=2*(2/0.8)=5 fps). In the example of FIG. 4, a buffer (frames within dashed line) may have a buffer capacity of about 129 frames (e.g., a video time interval of about 4.3 s) based at least in part on the acquisition frame rate (e.g., about 30 fps) and at least in part on a longest gesture time (e.g., maximum gesture duration of about 2 s).

In the example of FIG. 4, filled frames 354 represent sampled frames that exhibit evidence of a gesture. However, as shown, it takes eight sampled frames 354 before the evidence is sufficient to trigger transfer of buffered video data (see, e.g., crossed frame). Transferring and processing (e.g., per blocks 342 and 344 of FIG. 3) may cause a processing circuitry to be "busy" and unavailable for sampling and such constraints may influence selection or determination of buffer capacity. As mentioned, a busy or wait period may be implemented, for example, to not interfere with transferring or processing and to thereby help expedite such processes. Where "real-time" video data is also transferred, such transferring may occur responsive to a trigger and optionally after a busy or wait period. In such an example, sampling may be placed on-hold (e.g., temporarily disabled) and then resumed responsive to insufficient evidence of gesturing in real-time video data (e.g., no evidence for a period of about 10 seconds).

Figure 5:
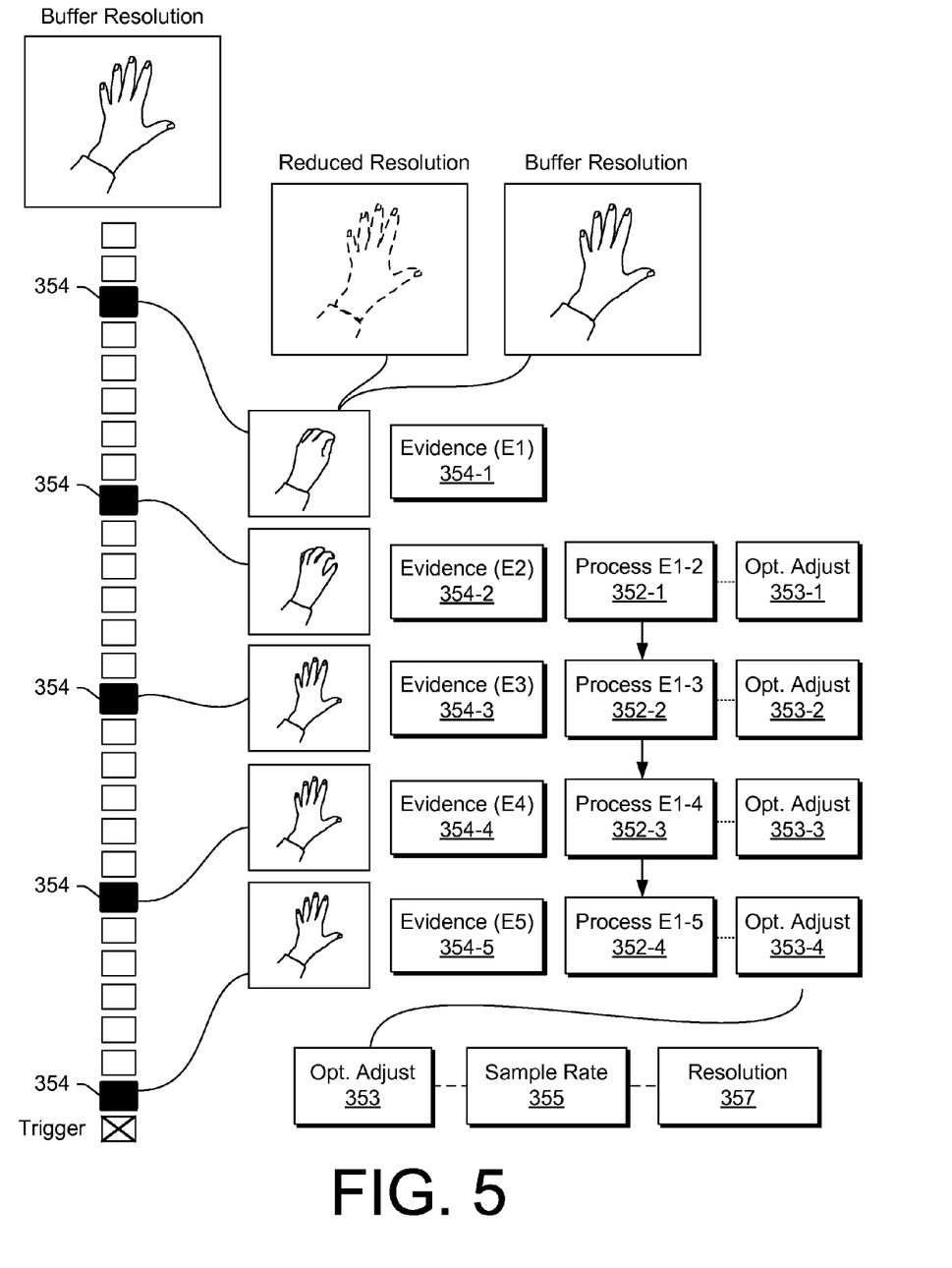
FIG. 5 is a diagram of an example of sampling video data and processing sampled video data.

FIG. 5 shows an example of processing sampled video data with respect to some of the frames 354 of the example of FIG. 4. FIG. 5 also shows how sampling may occur using a reduced resolution compared to a buffer resolution or camera acquisition resolution. The reduced resolution may be achieved by sampling less data (e.g., filtering, masking, skipping, etc.), by processing less data or a combination of both. Further, as indicated, one or more adjustments may occur to sampling rate, sampling resolution or both, optionally responsive to evidence in one or more samples. An increase in sampling rate in response to evidence in one or more samples may act to shorten trigger time for triggering transfer of buffered video data, which may make for more responsive gesture detection. As an example, consider an initial or base sampling rate of 3 fps, ramped to 5 fps after finding evidence in a sampled frame, ramped to 10 fps after finding additional evidence in a subsequent sampled frame. After a trigger event to trigger transfer of buffered video data, the sampling rate may be returned to a base sampling rate or may decay to the base sampling rate (or other rate) upon lack of evidence in one or more sampled frames.

In FIG. 5, each of the sampled frames is shown as including some gesture evidence. The "hand" gesture examples are shown for purposes of explanation as the view of a camera may differ depending on its position with respect to a user's hand or hands. For example, where a user is wearing a body camera (e.g., head or chest), the examples may be appropriate (e.g., back of hand), however, where a camera is in front of the user, the perspective would differ (e.g., the video data would show the palm side of the user's hand). Instances may exist where multiple cameras are configured to acquire data, a trigger may trigger transfer and analysis of a video data from a single buffer, video data from multiple buffers, real-time transfer of video data from a single camera, real-time transfer of video data from multiple cameras, etc.

In the example of FIG. 5, evidence is labeled 354-1 to 354-2, which is processed per process blocks labeled 352-1 to 352-4, each of which may optionally control a respective adjustment block, labeled 353-1 to 353-4. Per the example of FIG. 5, as evidence is gathered via sampling, and processed, a probability threshold may be reached to issue a trigger that initiates transfer of video data from a buffer to processing circuitry to piece together more complete evidence as to the nature of the gesture. In other words, the processing of the process blocks 352-1 to 352-4 may be rudimentary compared to a process block for processing buffered video data. The process blocks 352-1 to 352-4 may simply look for evidence of a gesture, without trying to assign the evidence to a specific gesture. In such an approach, processing associated with sampling may occur rapidly without placing any significant demands on resources of a device. As described herein, a standalone device, optionally a device that includes a camera, may include such sampling capabilities as well as buffering capability where, for example, upon issuance of a trigger, transfer of buffered video data occurs via a serial interface or other interface to another device for processing. In such an approach, resources of the other device are demanded on an as needed basis (e.g., other than, for example, periodic bus monitoring that provides for appropriate responsiveness).

Figure 6:
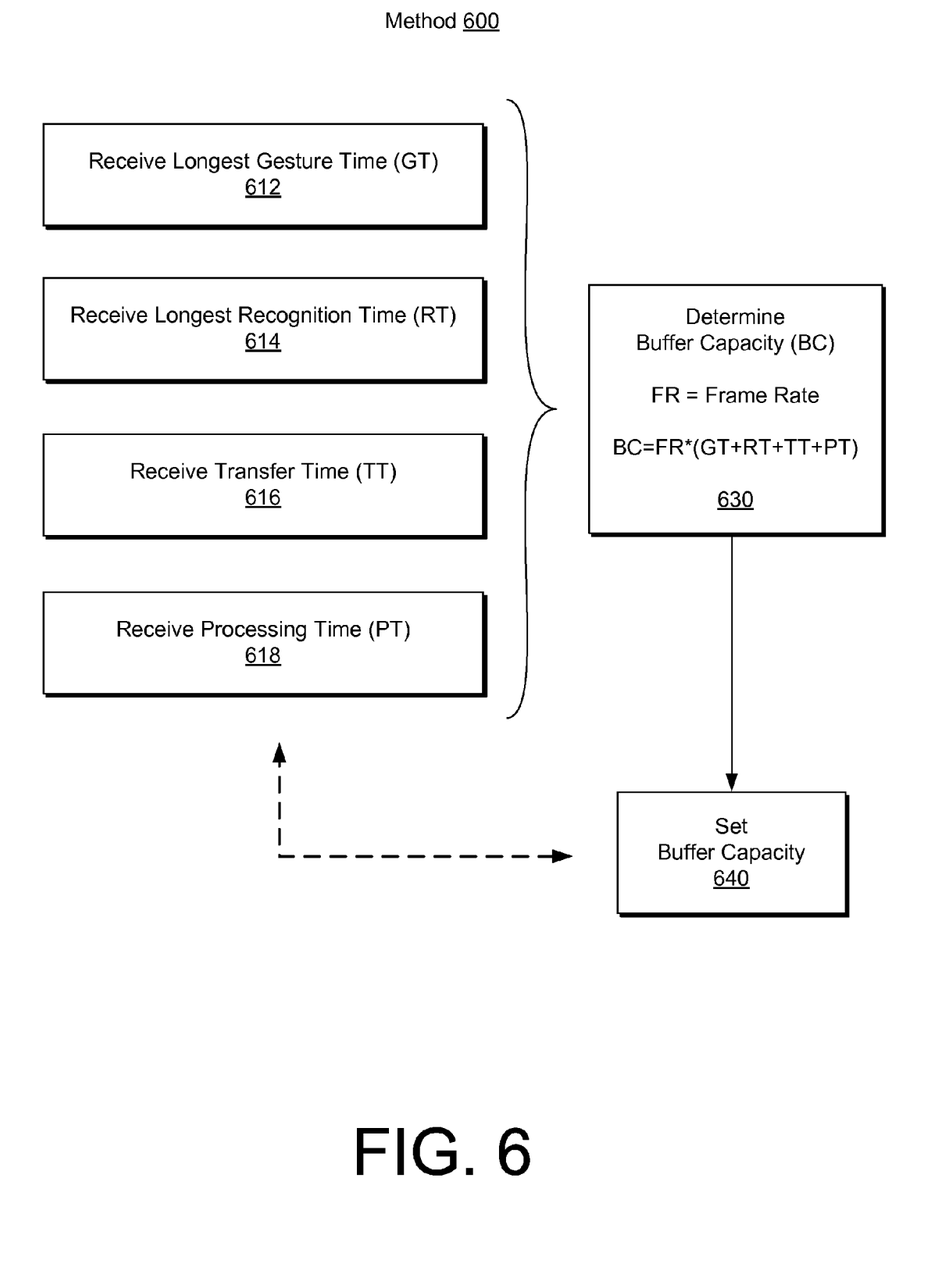
FIG. 6 is a diagram of an example of a method for determining a buffer capacity.

FIG. 6 shows an example of a method 600 for determining a buffer capacity (BC). The method 600 includes a reception block 612 for receiving a longest gesture time (GT), a reception block 614 for receiving a longest recognition time (RT), a reception block 616 for receiving a transfer time (TT), and a reception block 618 for receiving a processing time (PT). A determination block 630 receives one or more of these values and determines, for example, based in part on a frame rate (FR), a buffer capacity (BC). The determination block 630 may include an equation such as BC=FR*(GT+RT+TT+PT). A set block 640 is provided for setting the buffer capacity, for example, optionally in the form of a circular buffer.

As an example, consider a Frame Rate (FR) of 30 fps, a Longest Gesture Time (GT) of 2 s, a Recognition Time (RT) less than GT, a Transfer Time (TT) of 200 ms, a Processing Time (PT) of 100 ms such that the Buffer Capacity (BC) is a video time interval of 4.3 s (e.g., 2 s+2 s+0.2 s+0.1 s=4.3 s) or, in terms of frames, 129 frames (e.g., 30*4.3).

Figure 7:
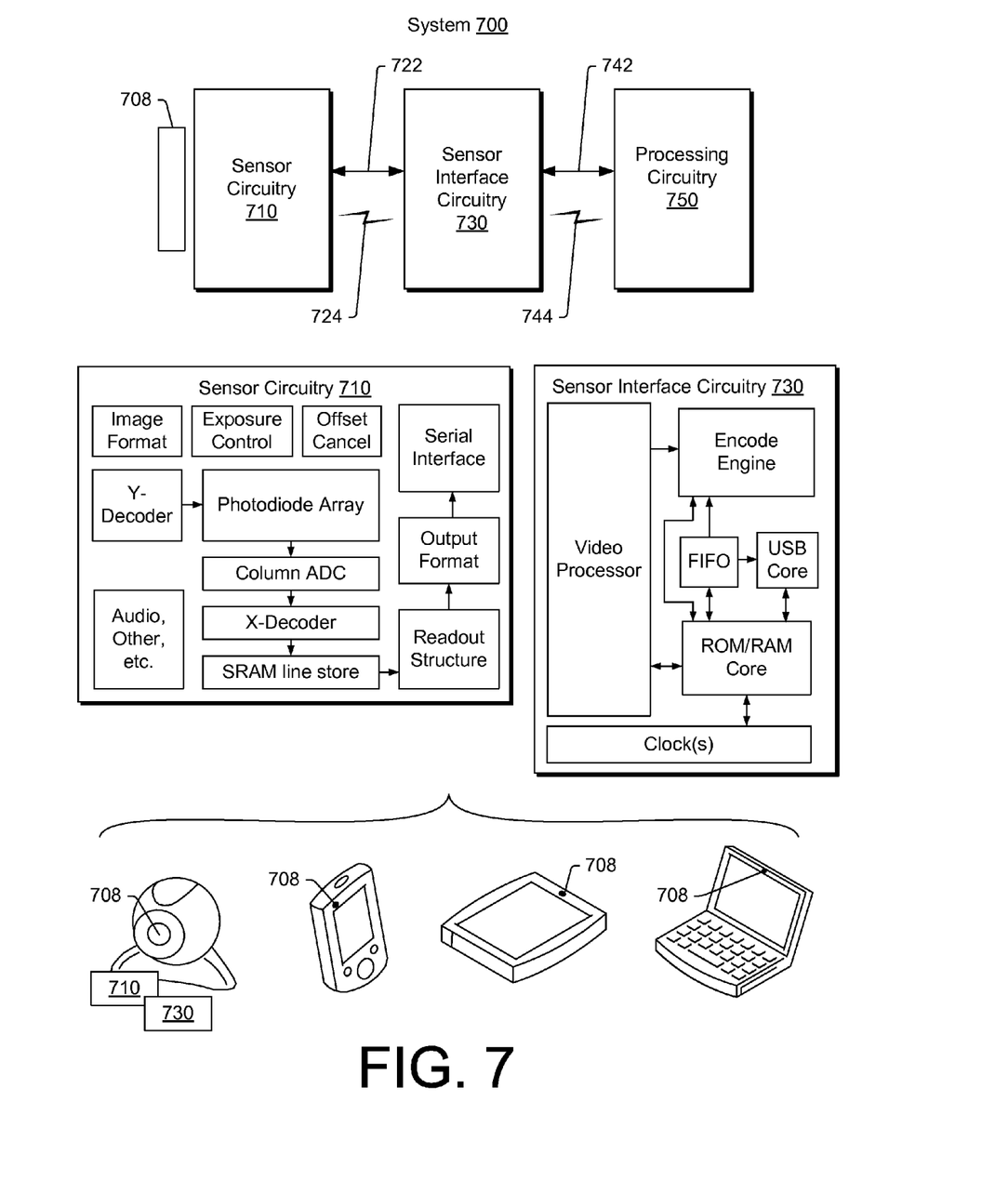
FIG. 7 is a diagram of an example of a system for camera-based gesturing.

FIG. 7 shows an example of a system 700 that includes sensor circuitry 710, sensor interface circuitry 730 and processing circuitry 750. To provide for sensing, the sensor circuitry 710 may include a lens 708 (e.g., an optical lens). As indicated, the circuitry 710, 730 and 750 may communicate using wired technology (see, e.g., links 722 and 742), wireless technology (see, e.g., links 724 and 744) or a combination of both.

The sensor circuitry 710 may include features such as a photodiode array with associated analog-to-digital control circuitry, memory circuitry, format circuitry, exposure circuitry, interface circuitry, etc. The sensory circuitry 710 may optionally include audio or other circuitry.

The sensor interface circuitry 730 may include features such as a video processor, an encode engine, FIFO or other logic, memory and a memory controller core, one or more clocks and serial interface circuitry such as a USB core. In the example of FIG. 7, memory of the sensor interface circuitry 730 may be optionally configured as a circular buffer to buffer video data for purposes of gesturing. Further, a video processor of the sensor interface circuitry 730 may be optionally configured for sampling video data and processing sampled video data for evidence of a gesture or gestures and optionally configured for triggering transfer of buffered video data to another device via an interface (e.g., a USB interface).

As shown in FIG. 7, various devices (e.g., a camera, a smart phone, a tablet, a notebook, etc.) may include a lens and sensor circuitry 710 and optionally sensor interface circuitry 730 and optionally processing circuitry 750. As shown, a stand-alone camera may include sensor circuitry 710 and sensor interface circuitry 730. Such a device may include a USB wired interface, which may provide power to power its circuitry. Such a device may be optionally configured to buffer video data as well as sample and process sampled video data and to trigger transfer of buffered video data to another device for further processing (e.g., for gesturing and issuing of one or more gesture-based commands).

Figure 8:
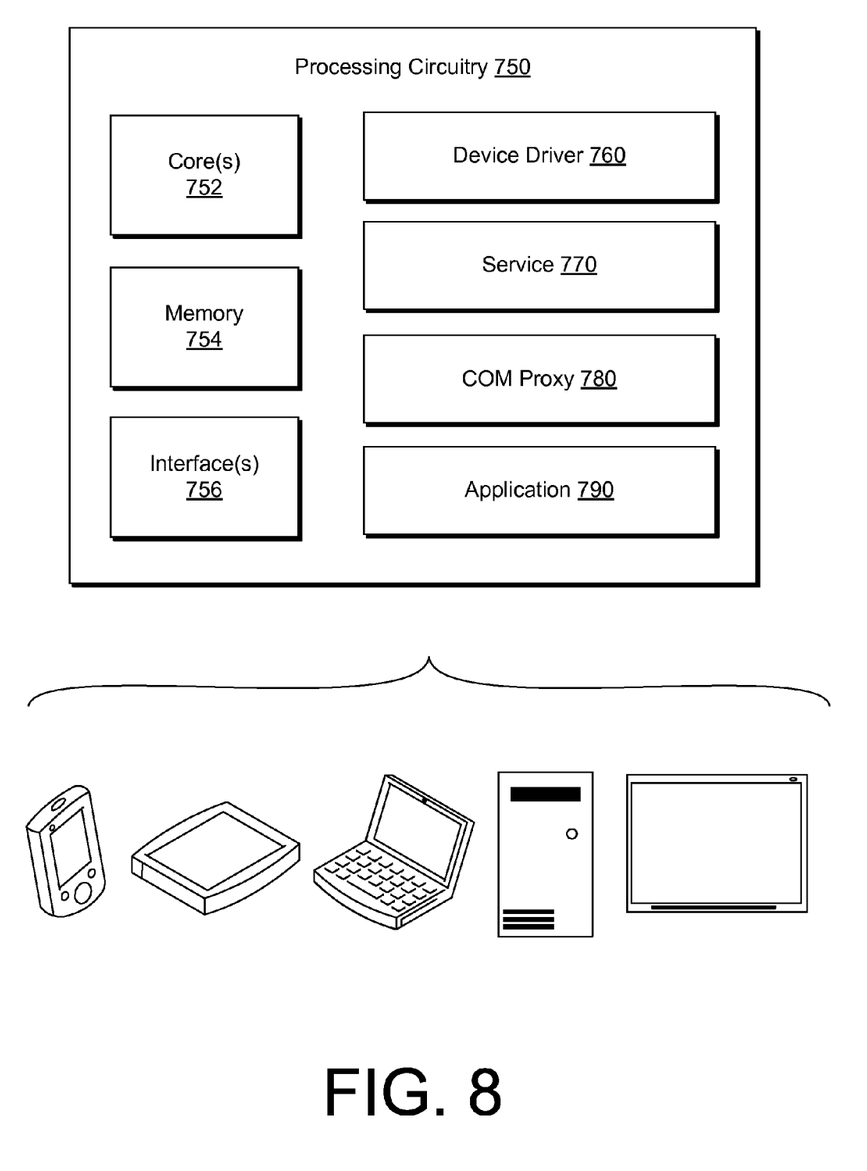
FIG. 8 is a diagram of an example of a processing circuitry for camera-based gesturing.

FIG. 8 shows processing circuitry 750 as including one or more cores 752, memory 754, one or more interfaces 756, a device driver block 760, a service block 770, a COM proxy block 780 and an application block 790.

The processing circuitry 750 may be configured to operate according to the Microsoft® Windows® Image Acquisition (WIA) application programming interface (API) and device-driver interface (DDI) (Microsoft Corporation, Redmond, Wash.). The WIA API allows applications to run in a process that is separate from the driver, enumerate available image acquisition devices, create simultaneous connections to multiple devices, query properties of devices in a standard and extensible manner, acquire device data by using standard and high-performance transfer mechanisms, and monitor a wide variety of device events.

The WIA technology provides for transfer of data from a device to another device (e.g., from a camera and its associated circuitry to motherboard circuitry of a computer). As an example, consider the following interface code associated with a data download from a device to the caller and cancelation of an operation:

```
interface IWiaTransfer : IUnknown
    {
        [helpstring("Initiates a data download from device to the caller")]
        HRESULT Download(
            [in] LONG         IFlags,
            [in] IWiaTransferCallback *pIWiaTransferCallback);
        [helpstring("Cancels the current transfer operation")]
        HRESULT Cancel( );
    };
```

In the WIA technology, a IWiaTransfer::Upload( ) takes an IStream interface directly, whereas IWiaTransfer:Download( ) takes a IWiaTransferCallback because IWiaTransfer::Upload( ) uploads a single item, whereas IWiaTransfen:Download( ) can transfer multiple items.

The WIA technology includes various other features. For example, the IWiaVideo interface provides methods that allow an application that uses Windows Image Acquisition (WIA) services to acquire still images from a streaming video device.

As another example of technology for handling video data, consider the Microsoft® DirectShow® application programming interface (API), which is a media-streaming architecture for the Microsoft Windows® platform. Using DirectShow®, applications can perform high-quality video and audio playback or capture. The DirectShow® features provide a Stream Buffer Engine that enables an application to seek, pause, and record a live video stream without interrupting the stream. Transitions between live and recorded content can be achieved in a relatively seamless manner. The Stream Buffer Engine supports, for example, MPEG-2 video and digital video (DV) sources (e.g., at capture rates up to 20 megabits per second (Mbps)).

As shown in FIG. 8, any of a variety of devices can include processing circuitry 750. For example, a smart phone, a tablet, a notebook, a desktop or server, a television or monitor, etc., may include processing circuitry 750. Such devices may optionally include sensor circuitry 710, sensor interface circuitry 730 or both.

As to a television or monitor, gesturing may allow for navigation of channels or other content (e.g., via one or more gesture-based navigation commands). For example, for broadcast channels, a channel menu may be invoked via a gesture and the menu navigated to select a channel, whether for viewing, purchase, recording, etc. As another example, consider a movie or a show being displayed where a gesture may act to pause content rendering, to fast forward content rendering, to reverse content rendering, etc. A device for camera-based gesturing may optionally be provided in the form of a camera and associated circuitry that samples, buffers, processes and outputs commands to a set-top box, cable box, computer, etc., to control content (e.g., scheduling, purchase, rendering, recording, etc.). Such a camera may be mountable to a television or monitor to acquire video data for a user, for example, seated a distance as far as several meters from the television or monitor.

Figure 9:
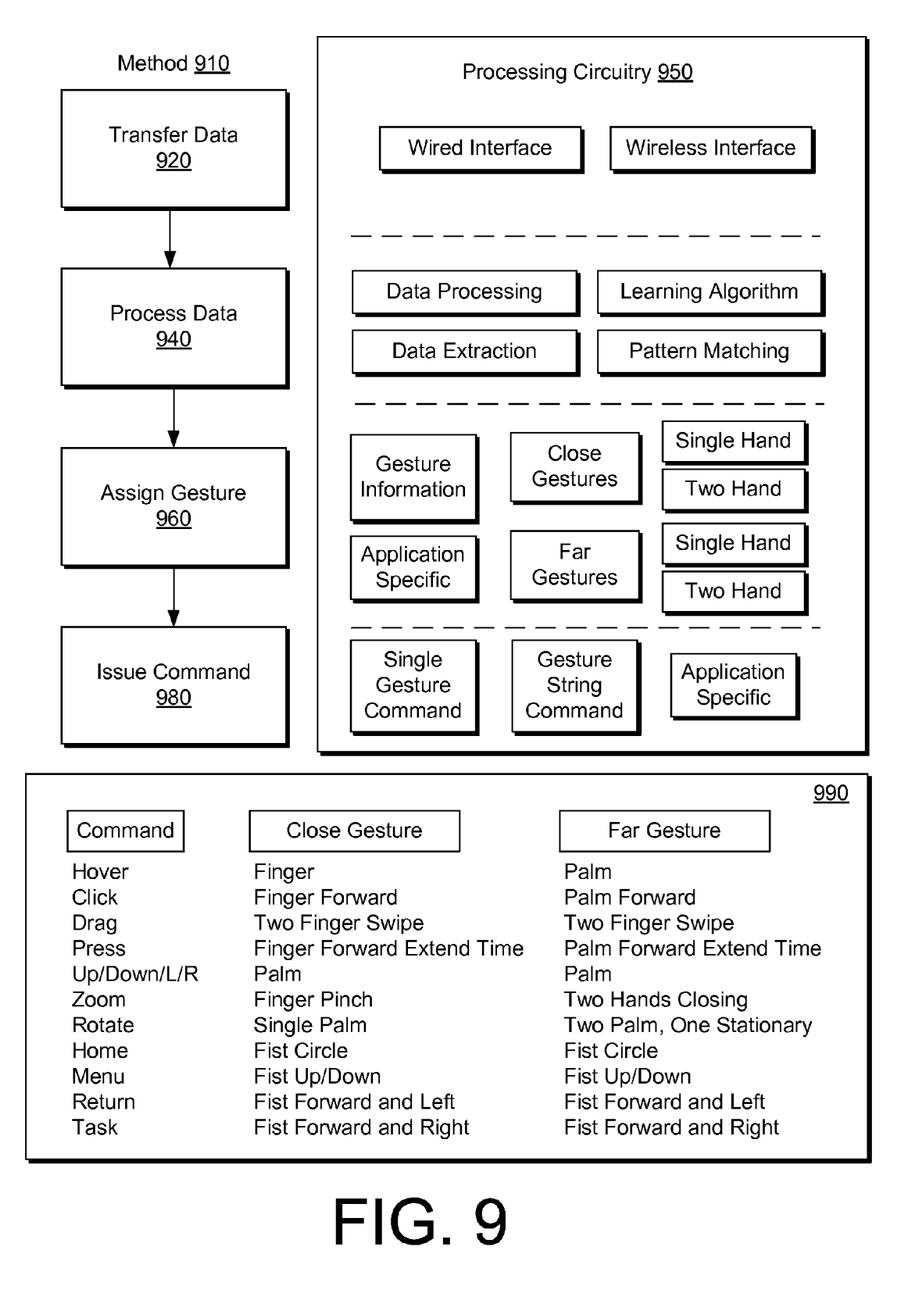
FIG. 9 is a diagram of an example of a method and an example of processing circuitry for camera-based gesturing.

FIG. 9 shows an example of a method 910 along with an example of processing circuitry 950 and an example of a gesture and command table 990. The method 910 includes a transfer block 920 for transferring video data, a process block 940 for processing video data (e.g., transferred video data), an assignment block 960 for assigning a gesture and an issuance block 980 for issuing a command based at least in part on an assigned gesture.

The processing circuitry 950 may provide features to perform the method 910. For example, the processing circuitry 950 may provide one or more interfaces for transferring data; data processing capabilities, data extraction capabilities, learning algorithm capabilities, and pattern matching capabilities for processing video data; gesture information, optionally application specific, for assigning a gesture; and commands related to gestures for issuing a command.

As to issuance of a command, a table or other data structure may be provided with information that relates commands and gestures. In the example of FIG. 9, the table 990 includes commands and related "close" gestures and "far" gestures. In such an example, the close gestures may be for a hand or hands in a distance of about 0.15 meter to about 3 meters from a camera lens and the far gestures may be for a hand or hands in a distance of about 3 meters to about 8 meters from a camera lens. As indicated, a gesture may be the same or may differ depending on distance of a user's hand or hand from a camera lens. The processing circuitry 950 may include memory to store information of the table 990, an interface to access such information, etc., for purposes of performing the processing, assigning or issuing of the method 910.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 10:
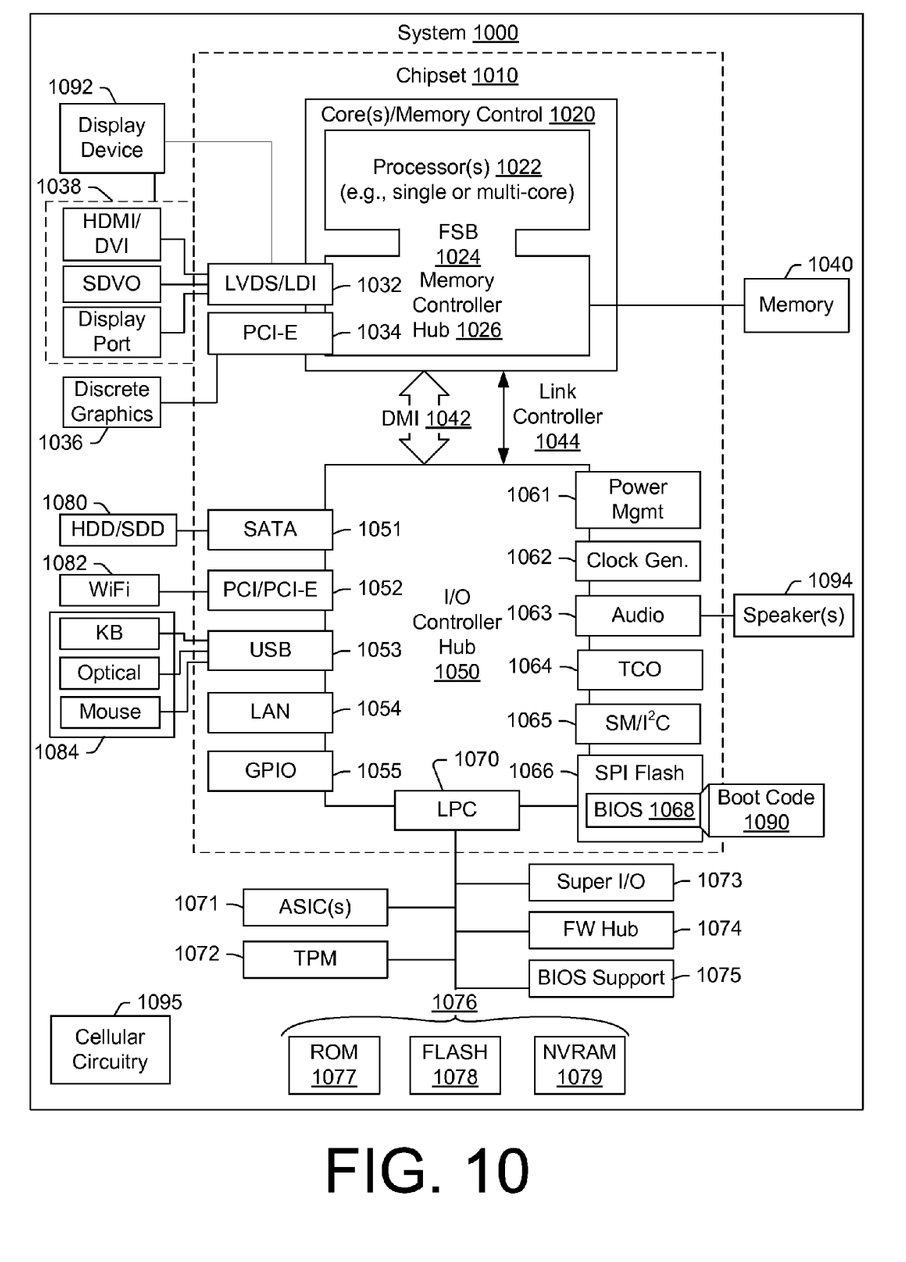
FIG. 10 is a diagram of an example of a system, which may be part of a device.

While various examples of circuits or circuitry have been discussed, FIG. 10 depicts a block diagram of an illustrative example of a computer system 1000. The system 1000 may be a desktop computer system, for example, such as one of the ThinkCentre® or ThinkPad® series or IdeaPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a device may include other features or only some of the features of the system 1000.

As shown in FIG. 10, the system 1000 includes a so-called chipset 1010. A chipset refers to a group of integrated circuits, or chips, that are designed to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory" or "main memory" or "primary memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. The system 1000 may include circuitry for wireless delivery of video (e.g., WiFi circuitry).

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface. One or more interfaces of the system 1000 may be suitable for receiving, transmitting or receiving and transmitting information with a sensor such as an accelerometer (e.g., to effectuate orientation or other control).

The interfaces of the I/O hub controller 1050 provide for communication with various devices, networks, etc. For example, the SATA interface 1051 provides for erasing, reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), mice and various other devices (e.g., circuitry, camera devices, phones, storage, media players, etc.). As to cellular communication, the system 1000 can include cellular circuitry 1095. Such circuitry may be circuitry suitable for a cell phone or other device that communicates via one or more frequencies (e.g., TDMA, CDMA, GSM, etc.). The system 1000 may optionally include GPS circuitry for GPS communications and GPS functionality.

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a device or other machine may include fewer or more features than shown in the system 1000 of FIG. 10. For example, the device 201 of FIG. 2 or other device (see, e.g., FIG. 8) may include some or all of the features shown in the system 1000.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
    buffering video data to a buffer that comprises a buffer capacity that corresponds to a video time interval that exceeds a sum of a longest gesture time interval and a recognition time interval for processing sampled video data for gesture evidence;
    sampling video data at a sampling rate of at least once per video time interval wherein the sampling rate comprises a frame sampling rate, wherein the buffering comprises buffering video data at a frame buffering rate, and wherein the frame buffering rate exceeds the frame sampling rate;
    processing the sampled video data for gesture evidence; and
    responsive to recognition of gesture evidence in the sampled video data,
    processing the buffered video data for additional gesture evidence.

2. The method of claim 1 wherein the buffering comprises buffering the video data to a circular buffer.

3. The method of claim 1 wherein the buffer capacity comprises a frame capacity based at least in part on a video frame rate.

4. The method of claim 1 wherein the processing the buffered video data for additional gesture evidence comprises processing the buffered video data directionally toward older buffered video data.

5. The method of claim 1 further comprising, responsive to additional gesture evidence in the buffered video data, issuing a command based at least in part on the gesture evidence and the additional gesture evidence.

6. The method of claim 5 wherein the command comprises a navigation command.

7. A system comprising:
    circuitry to buffer video data at a frame buffering rate to a buffer that comprises a buffer capacity that corresponds to a video time interval that exceeds a sum of a longest gesture time interval and a recognition time interval for processing sampled video data for gesture evidence;
    circuitry to sample video data at a frame sampling rate wherein the frame buffering rate exceeds the frame sampling rate;
    circuitry to process sampled video data for gesture evidence;
    circuitry to process buffered video data for gesture evidence responsive to recognition of gesture evidence in sampled video data; and
    circuitry to assign gesture evidence in sampled video data and gesture evidence in buffered video data to a single gesture.

8. The system of claim 7 wherein the buffer comprises a circular buffer that receives video data from the circuitry to buffer video data.

9. The system of claim 7 further comprising a video camera.

10. The system of claim 7 wherein the circuitry to process buffered video data for gesture evidence comprises circuitry responsive to recognition of gesture evidence in sampled video data.

11. The system of claim 7 wherein the circuitry to sample video data samples video data according to a sampling resolution, wherein the circuitry to buffer video data buffers video data according to a buffering resolution and wherein the buffering resolution exceeds the sampling resolution.

12. The system of claim 7 further comprising output circuitry for output of gesture-based commands.

13. One or more computer-readable non-transitory media comprising processor-executable instructions to instruct a processor to:
    buffer video data to a circular buffer at a frame buffering rate wherein the circular buffer comprises a buffer capacity that corresponds to a video time interval that exceeds a sum of a longest gesture time interval and a recognition time interval for processing sampled video data for gesture evidence;
    sample video data at a frame sampling rate wherein the frame buffering rate exceeds the frame sampling rate;
    process sampled video data for evidence of a gesture;
    process buffered video data for additional evidence of a gesture responsive to evidence of a gesture in the sampled video data; and
    issue a command based at least in part on evidence of a gesture in the sampled video data and additional evidence of a gesture in the buffered video data.

14. The one or more computer-readable non-transitory media of claim 13 further comprising instructions to instruct a processor to:
    define the sampling rate based at least in part on a minimum gesture time.

15. The one or more computer-readable non-transitory media of claim 13 further comprising instructions to instruct a processor to process buffered video data directionally toward older buffered video data.

\* \* \* \* \*